Figure 1:
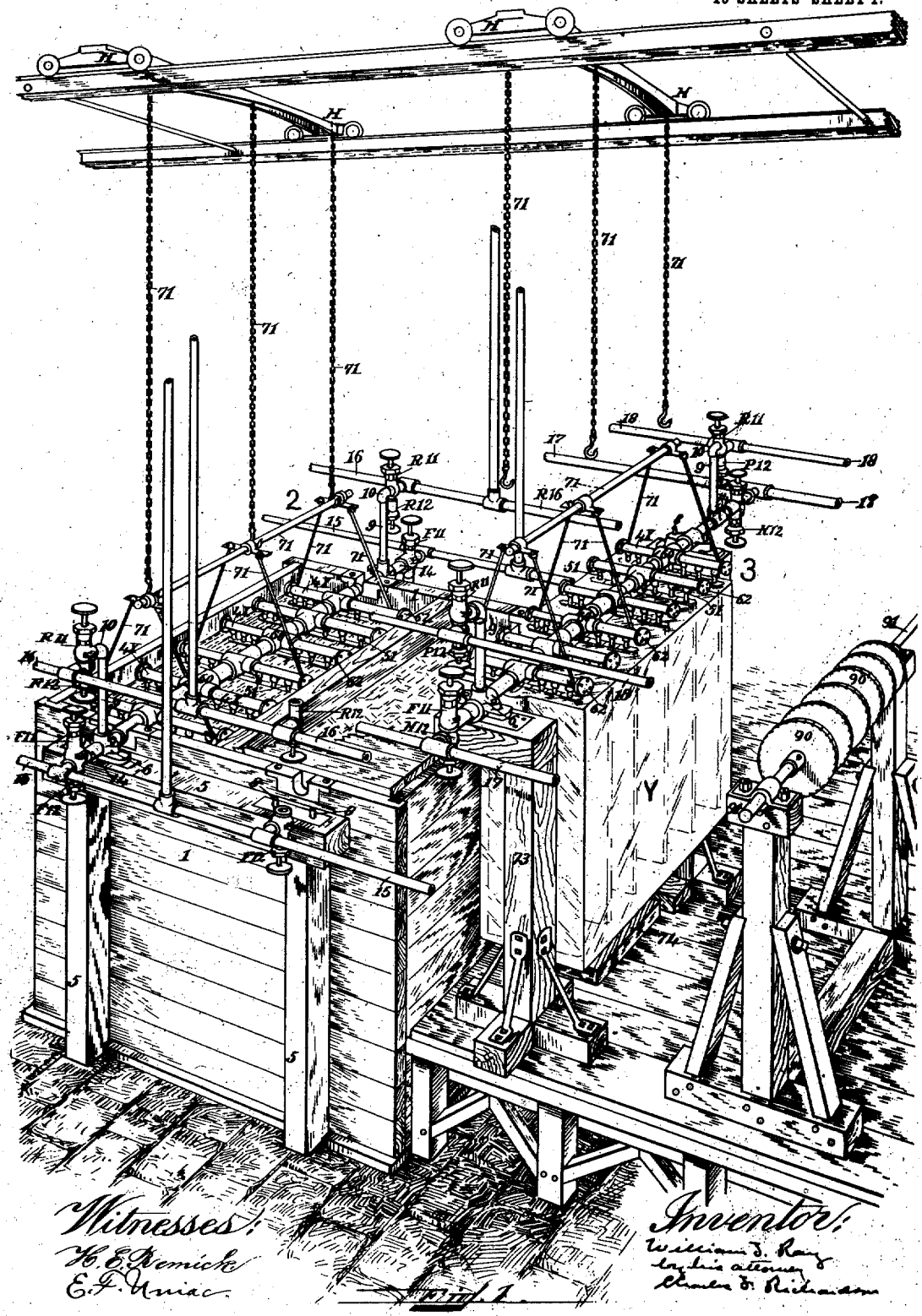

W. T. RAY.
ICE MAKING MACHINE.
APPLICATION FILED MAR. 28, 1910.

990,590.

Patented Apr. 25, 1911.
15 SHEETS—SHEET 2.

W. T. RAY.
ICE MAKING MACHINE.
APPLICATION FILED MAR. 28, 1910.

990,590.

Patented Apr. 25, 1911.
15 SHEETS—SHEET 6.

Witnesses:
H. E. Kemick
E. F. Kmac

Inventor:
William T. Ray
by his attorney
Charles T. Richards

W. T. RAY.
ICE MAKING MACHINE.
APPLICATION FILED MAR. 28, 1910

990,590.

Patented Apr. 25, 1911.
15 SHEETS—SHEET 10.

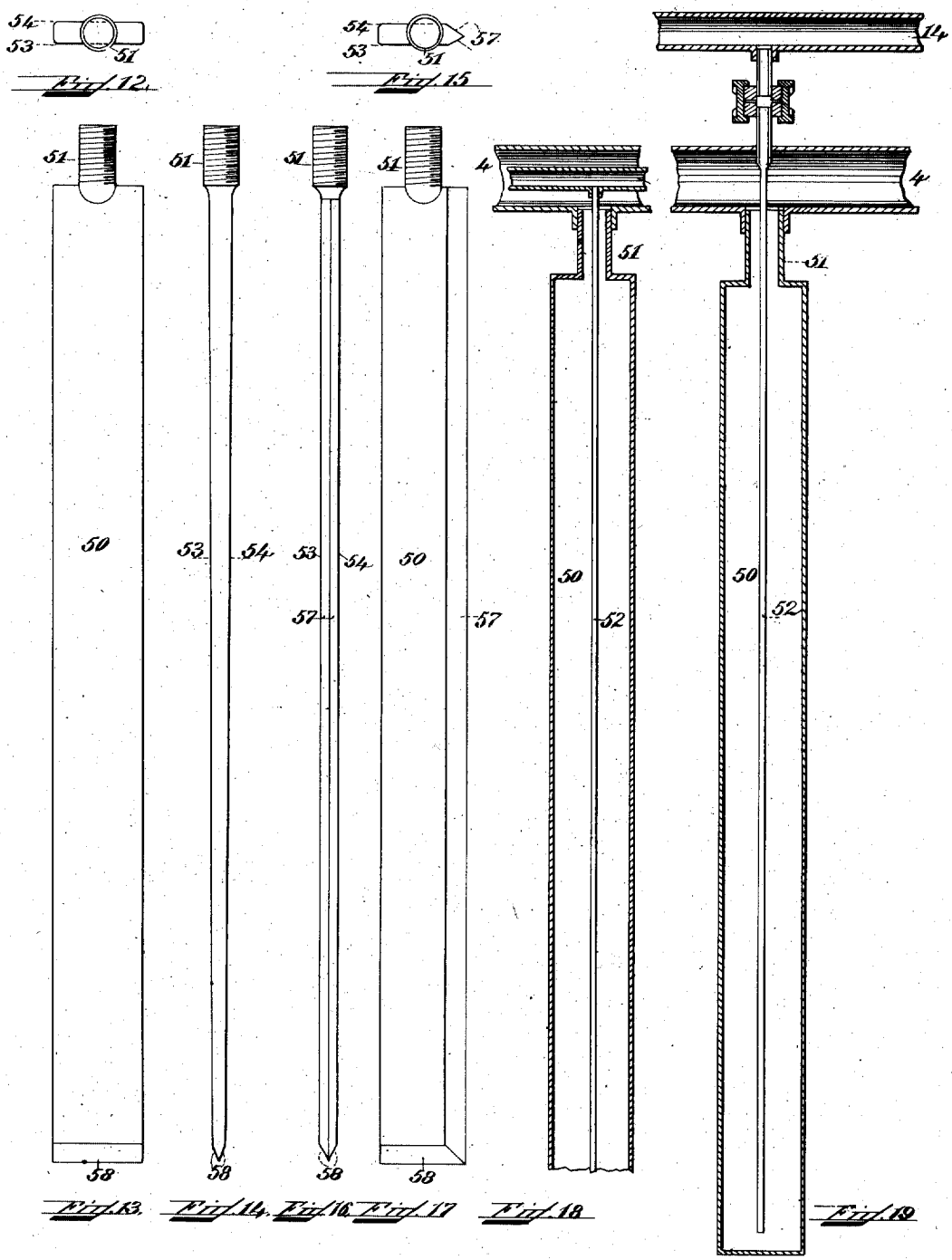

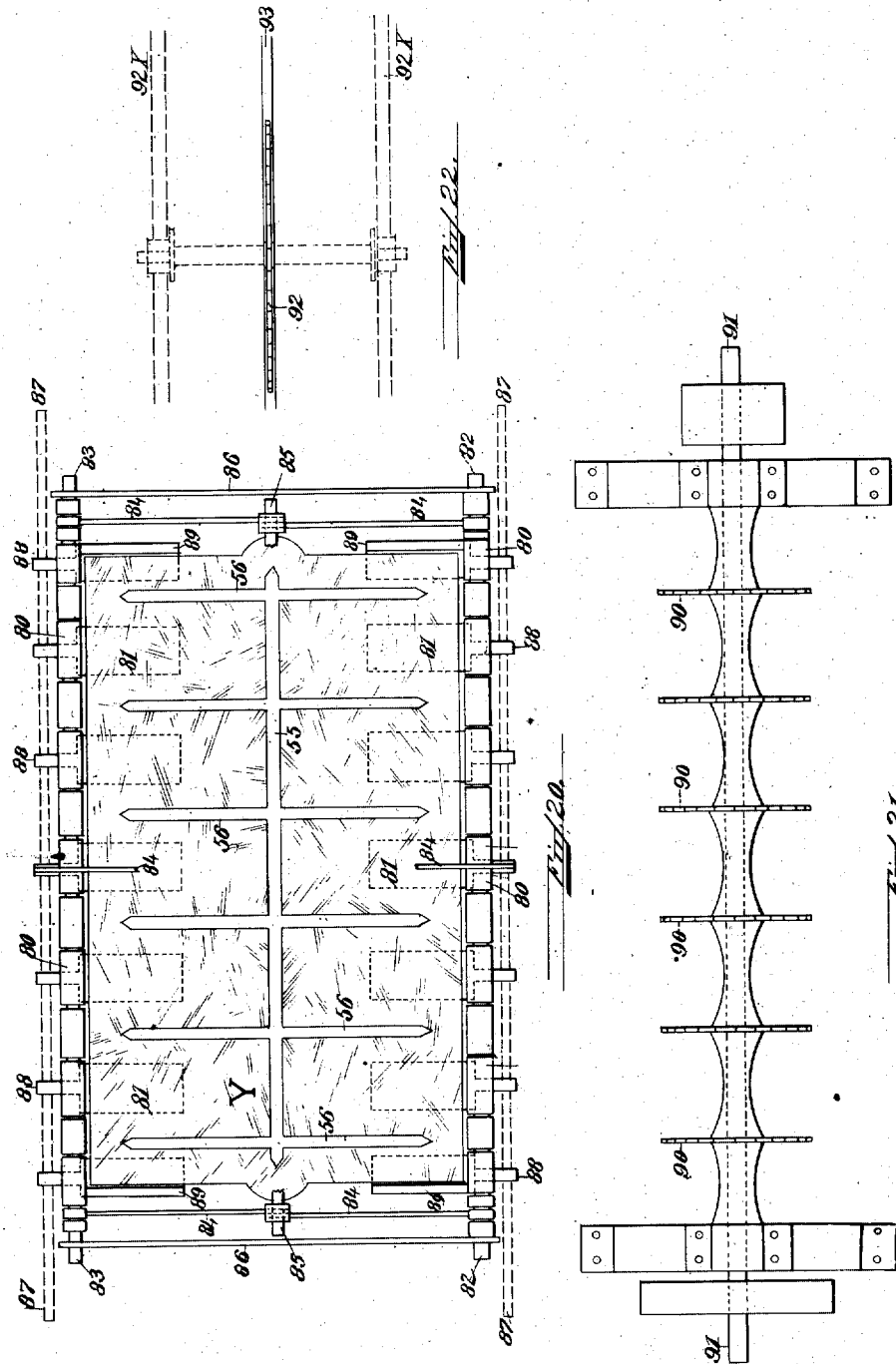

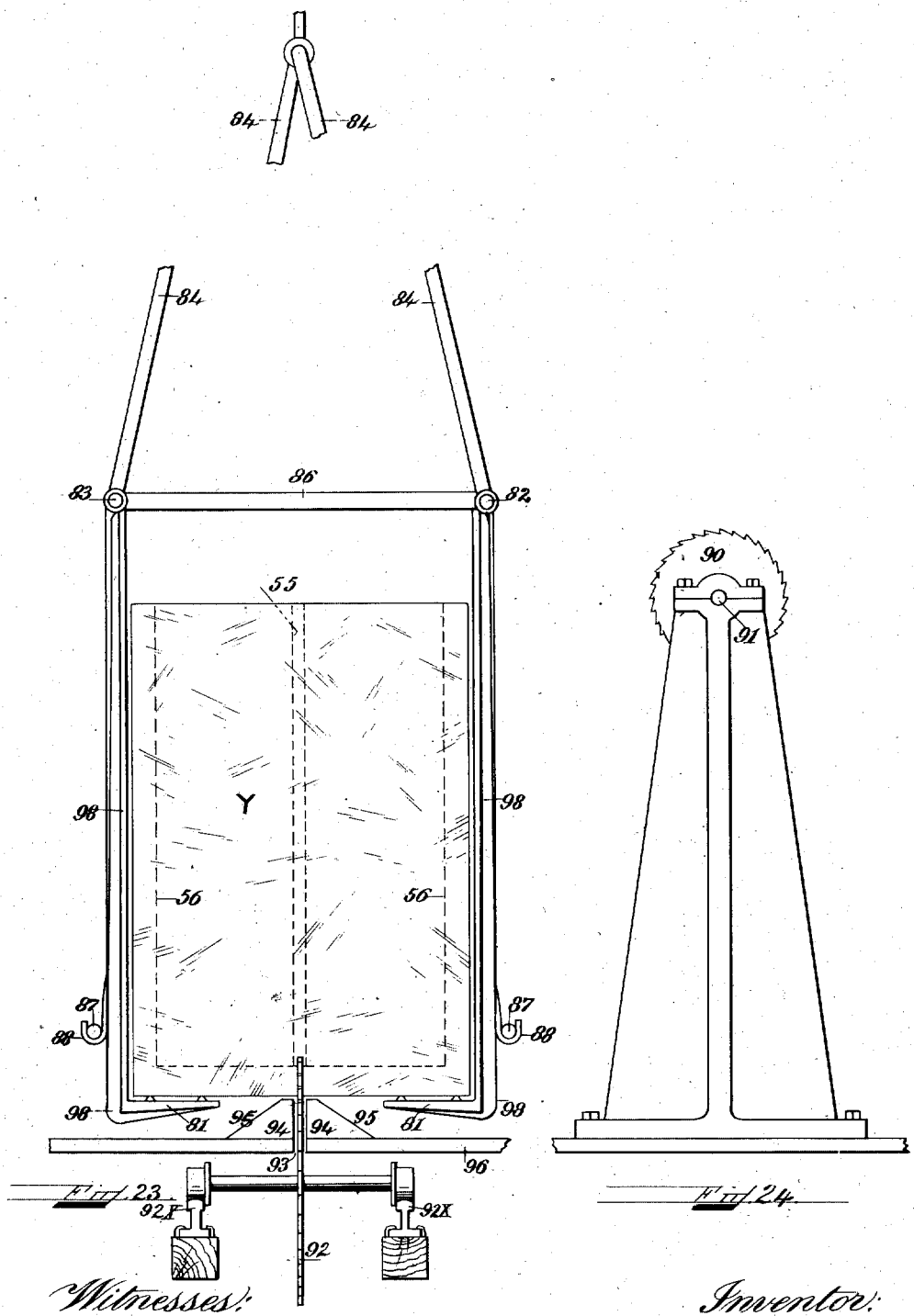

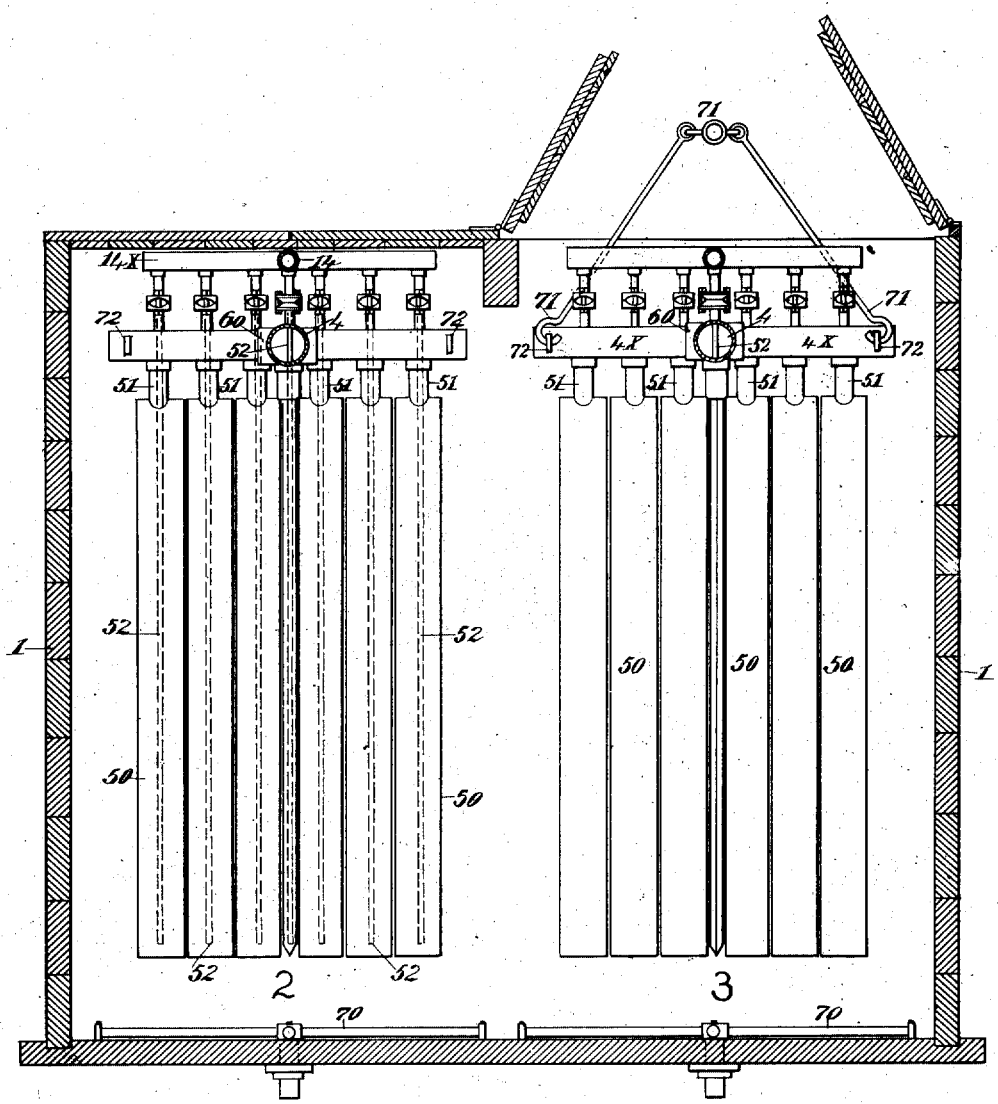

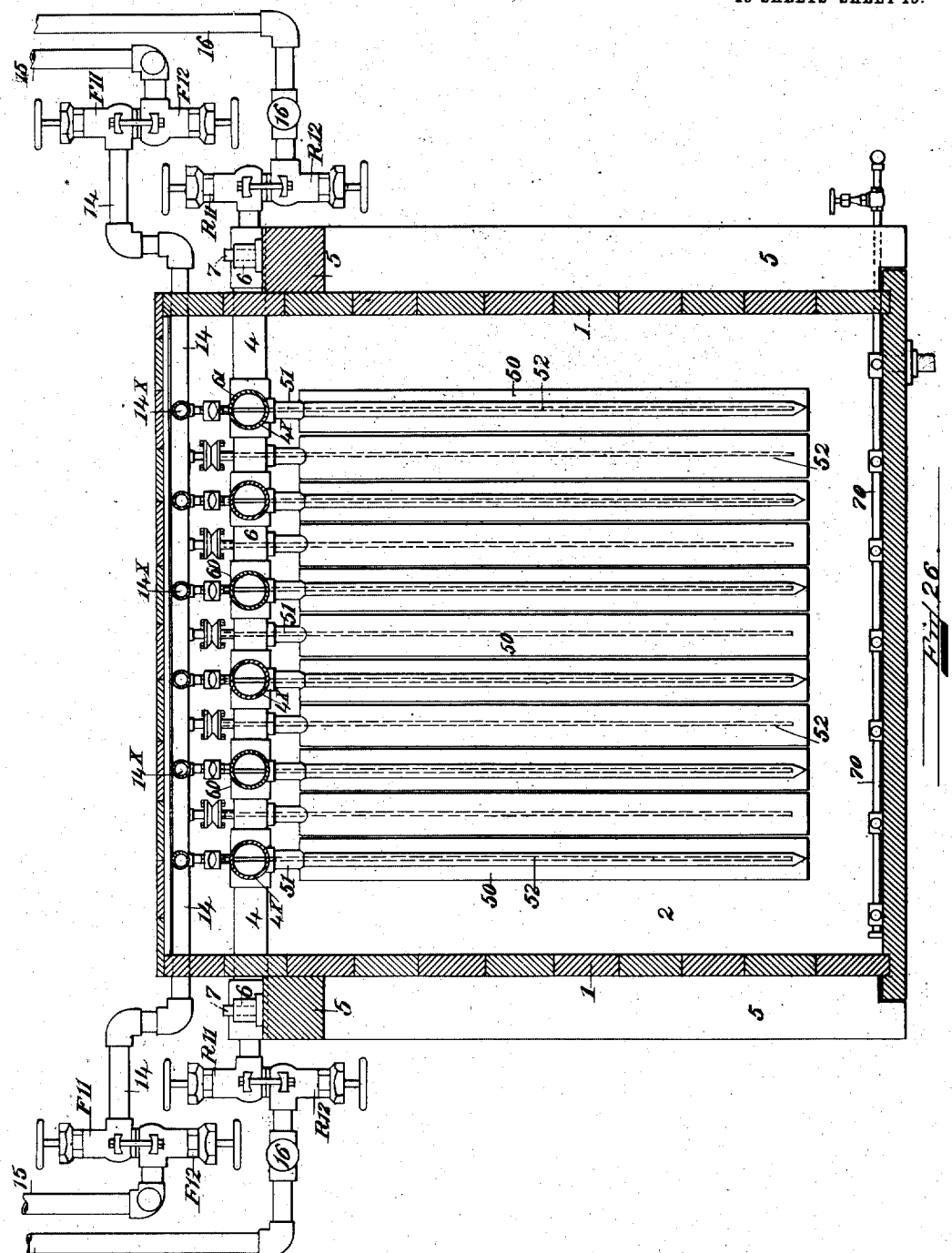

UNITED STATES PATENT OFFICE.

WILLIAM T. RAY, OF SOMERVILLE, MASSACHUSETTS.

ICE-MAKING MACHINE.

990,590.  Specification of Letters Patent.  Patented Apr. 25, 1911.

Application filed March 28, 1910. Serial No. 551,827.

*To all whom it may concern:*

Be it known that I, WILLIAM T. RAY, a citizen of the United States, residing at Somerville, in the county of Middlesex and State of Massachusetts, have invented certain new and useful Improvements in Ice-Making Machines, of which the following is a specification, reference being had therein to the accompanying drawings.

Heretofore, the freezing plates of ice making machines employing anhydrous ammonia have been permanently fixed in water tanks, and have not, as have freezing plates of ice machines using brine, been removable therefrom, for the purpose of harvesting their crops of ice; the reason being that the connections between the coils, and the feed and return pipes would be such, that, upon breaking them prior to the removal of the coils from the tank, there would be an escape of a substantial amount of ammonia into the atmosphere, unless the ammonia had been previously pumped out; an operation consuming one or more hours, and likely to result in introducing air into the system, and seriously interfering with refrigeration.

Now one of the objects of my invention is to prevent the above mentioned escape, and thus enable the construction and use of an anhydrous ammonia ice making machine, which with its ice may be removed from the water tank, to permit harvesting outside thereof. I accomplish this object by means of a new twin-valve-coupling, each member of which has a valve and seat, so designed that when the two members of the coupling are secured together and the valves have found their seats, all of the space intervening between the two valve seats is filled by portions of the valves which abut each other. Consequently, when the coupling is broken, *i. e.* when one member with closed valve, say, on the feed pipe, and the other member with closed valve on the pipe communicating with the coil, are separated, there is no ammonia to escape either from the feed pipe or from the coil, because there is no intervening unfilled space between the two valve seats. Obviously, if all of the pipes leading to and from the coils are provided with such connections, all the connections may be broken without the escape of ammonia either from the pipes or from the coils; and the latter may, at once, be lifted out of the tank and conveyed to a suitable harvesting standard provided with similar coupling members to couple with those on the removable coils, so that hot gas may be speedily used to free the ice from the coils, and, after the harvesting of the ice, may be retained in the coils, and later returned with the coils to the tank to be there again employed in refrigeration. This feature of my invention, namely, the twin-valve coupling, although only shown and described herein, is described and claimed in divisional application No. 599,485, filed by me December 27, 1910.

Another object of my invention is so to design and arrange my freezing plates that they may form not only one large block of ice, but harvesting slots therein which partially divide the block into a number of nearly wholly formed smaller blocks of the desired shape and size; said harvesting slots later being extended by saw cuts, or by splitting, to complete the division of the large block into smaller blocks.

A further object is to provide a freezing plate which is efficient, simple in construction, and inexpensive to manufacture; and I attain this object by making use of one or more thin flat tubes or unit blades, each of which is closed at its bottom end, and adapted to be connected at the upper end with, say, a return pipe; while within the blade, a smaller pipe, designed to connect with a feed pipe, extends down the inside of the blade, nearly to its bottom, so that, over the entire inside of the freezing surfaces of the blade, there may be a good circulation not only of the expanding refrigerant liquid, but also of the hot gas to release the ice from the outside freezing surfaces of the blade. By arranging such blades in the plane of, and under, the feed and return pipes, a continuous freezing plate of any desired width may be formed. Further, they may be combined as above mentioned, to form one or more ice freezing spaces having three freezing sides, or two freezing sides, and when so combined, I call them a "cluster."

In prior anhydrous ammonia freezing devices, there have been at the bottom, drip cocks and oil tanks connected therewith for drawing off oil, or weak liquid, or both. Now by the use of unit blades, such products may be quickly and easily removed by simply inverting the blades and opening the ends of the return pipe. It may be said also that as these blades have no bolt or rivet holes exposed to the water, the blades may be completely galvanized, and hence can not rust and discolor the ice, as do such holes in the ordinary galvanized freezing plates. As this blade freezing plate does away with the old freezing plates and coil between them, it obviates the formation between the coil and the plates, of waste ice which interferes both with the growth of ice on the outside of the freezing plates, and with the harvesting of it. Further, the connections between the tubes and the common return and common feed pipes are above the water in the tank.

There are great advantages resulting from the use of removable ice forming devices. For example, the ice water tank may be continuously used. As soon as one body of ice is formed, it with its ice forming device, may be removed from the tank, for harvesting, and another ice forming device be immediately substituted to freeze another crop. The tank is thus worked to its limit. None of the heat of the hot anhydrous ammonia required in harvesting the ice, can raise the temperature of the water in the tank, for the harvesting of the ice takes place outside of the tank. And further, the hot anhydrous ammonia is, in the process of harvesting, condensed, so that when the freezing device with the condensed anhydrous ammonia is returned to the water tank, it is at or near 32° Fahrenheit, and does not affect the freezing temperature of the water; so that the latter is in condition to be at once transformed into ice by the contacting ice forming surfaces, which may begin refrigeration the moment the valve in the return pipe is slightly cracked to relieve the pressure due to the compressor which supplied the hot gas in harvesting outside of the tank. Further, by not harvesting the ice in the tank, there are no chances, for example, for dirt, as from operatives' boots, to collect on the surface of the water or on the bottom of the tank; for fragments of ice, broken off in harvesting the blocks, as by ice tongs on the hoist; for pieces of ice to be accidentally frozen to the bottom of the tank, and then have to be severed as by a steam ice cutter. In fine, there are no ice fragments and dirt to be removed from the tank, to prevent the formation of dirty and imperfect ice. Further still, by harvesting the ice, outside of the tank, the ice is not reduced in size, as it would be, were it harvested in the tank, where, upon the removal of a piece of ice, additional water has to be let in to fill up the tank to float the ice at a proper level. This movement of the freshly introduced water injuriously melts the ice in the tank. And finally, it may be said that by the use of interchangeable "clusters", a given quantity of ice can be produced from a water tank, much smaller than formerly required; and the time heretofore consumed in harvesting the ice in the tank, and in reducing the temperature of the warmed water to a working temperature for the next crop of ice, be saved, because the ice on a unit is harvested outside of the tank, while a duplicate unit is at work in the tank; therefore, the time of harvesting is negligible as affecting the productive capacity of the tank.

Figure 2:
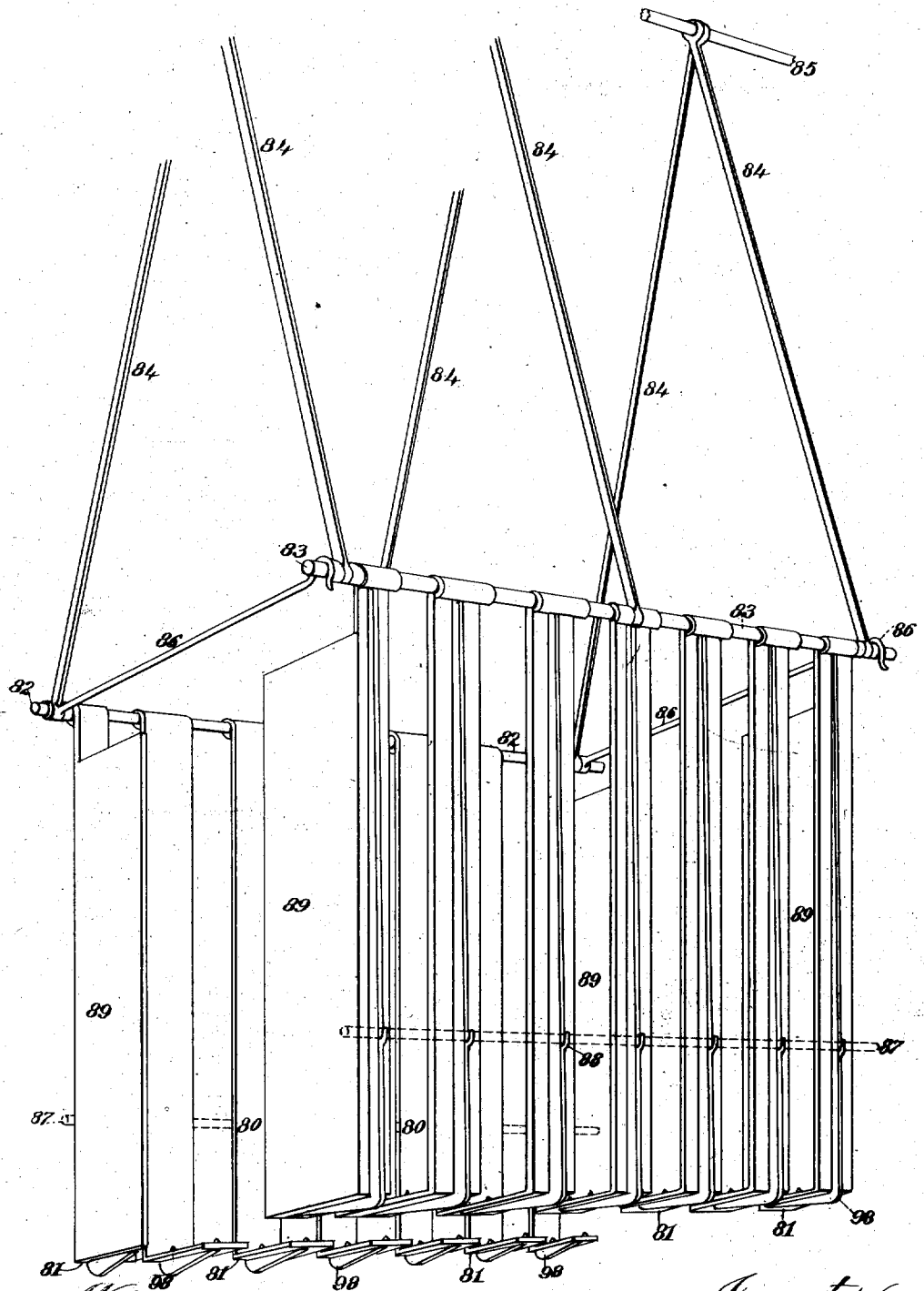
Figure 3:
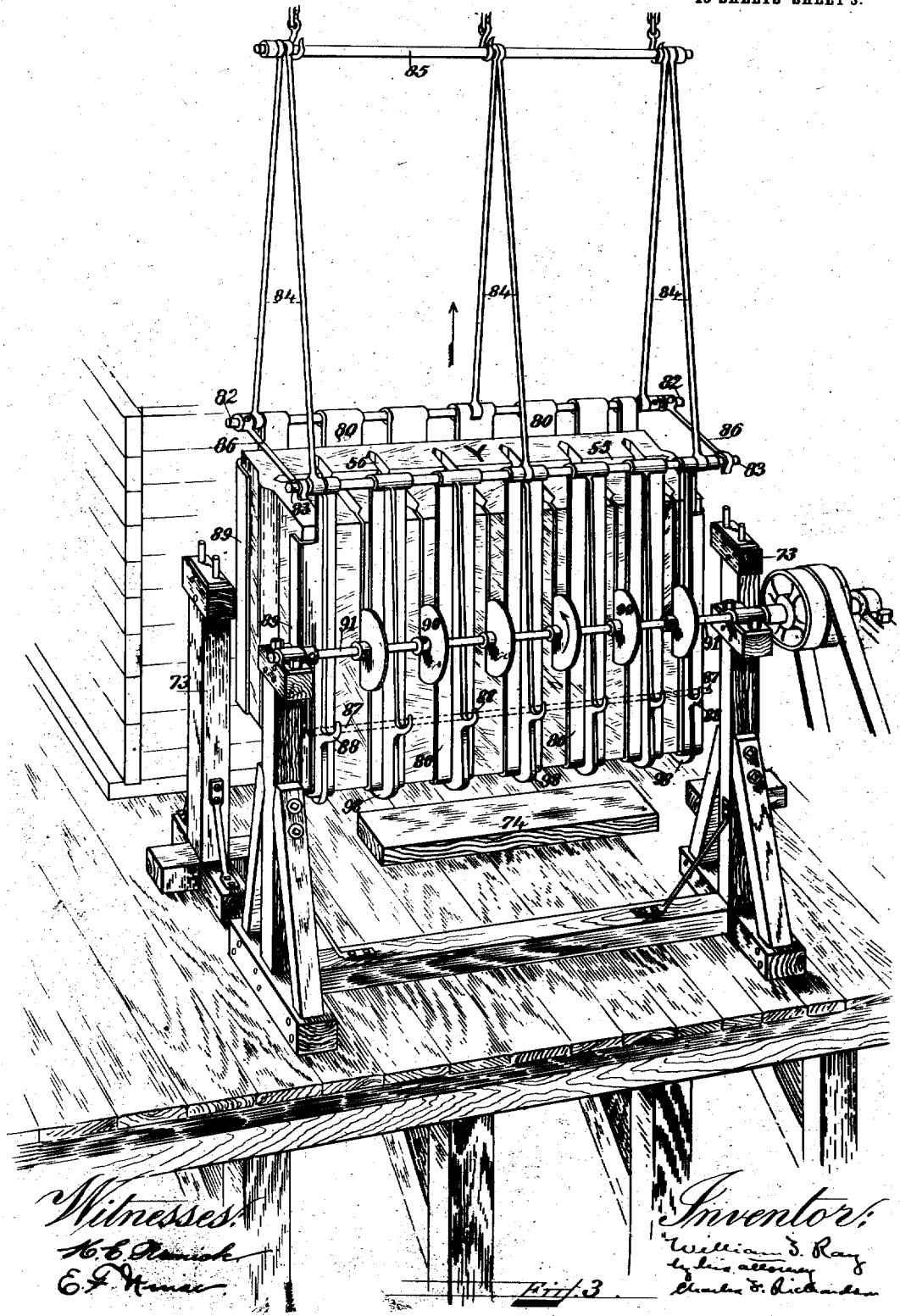
Figure 4:
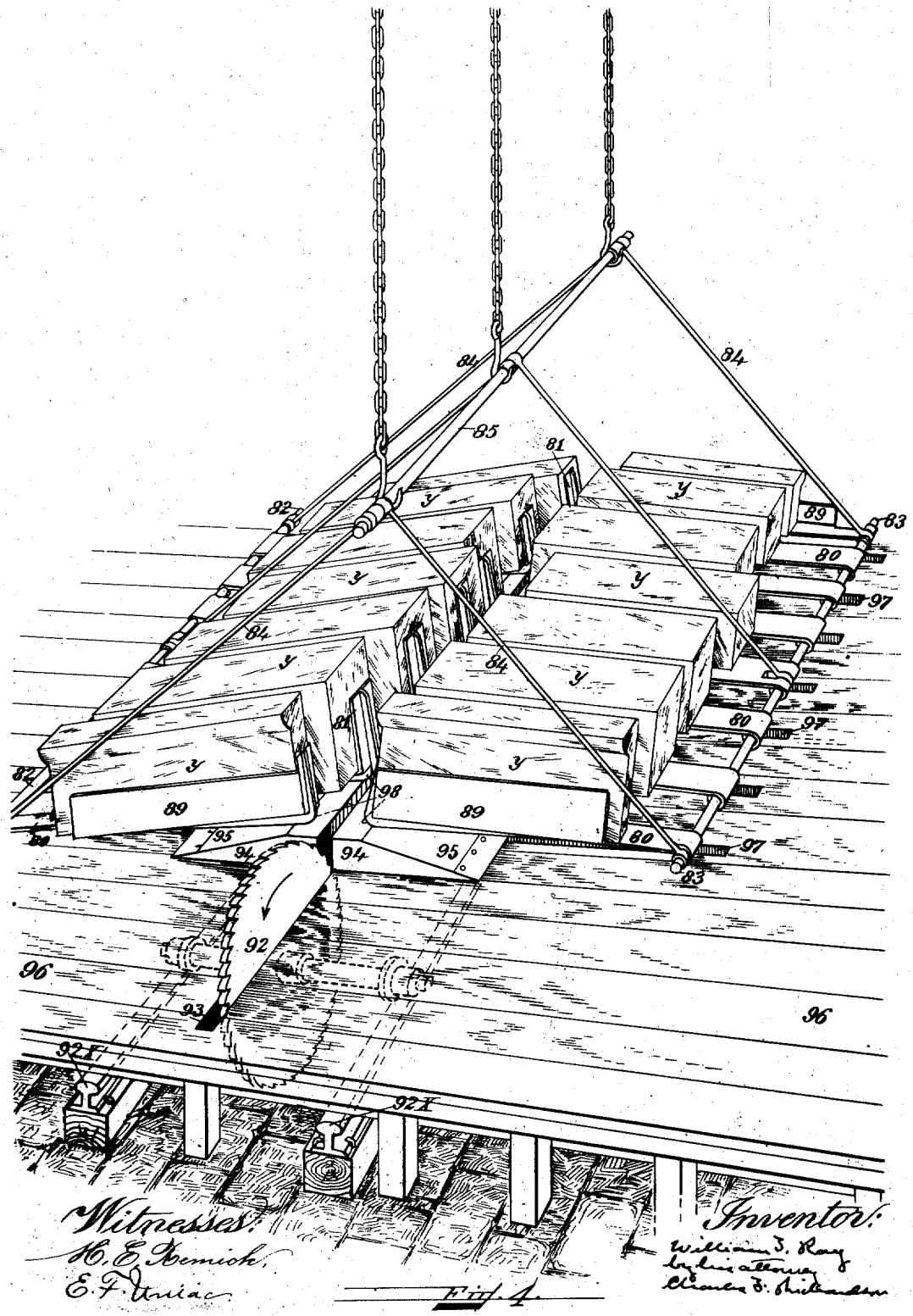
Figure 5:
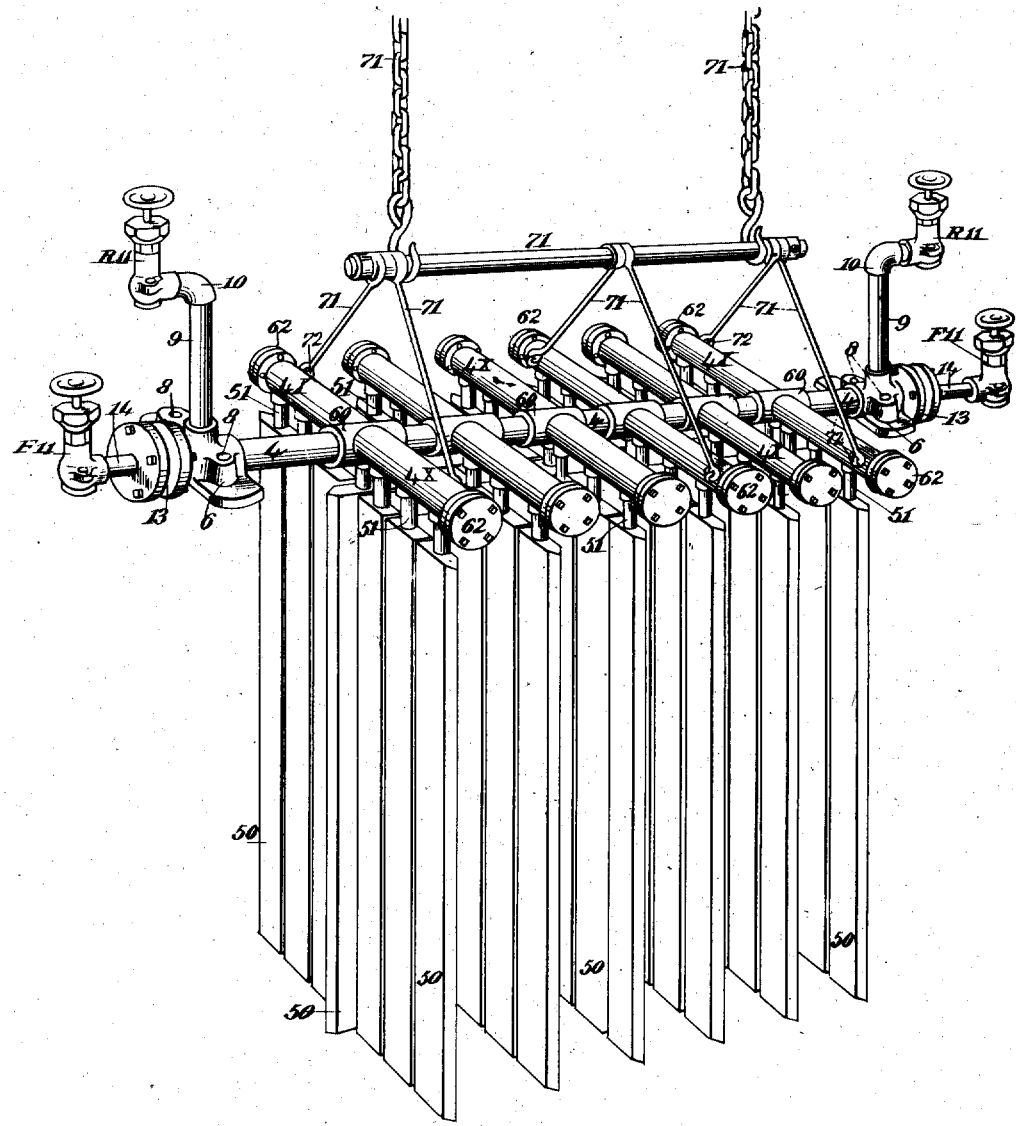
Figure 6:
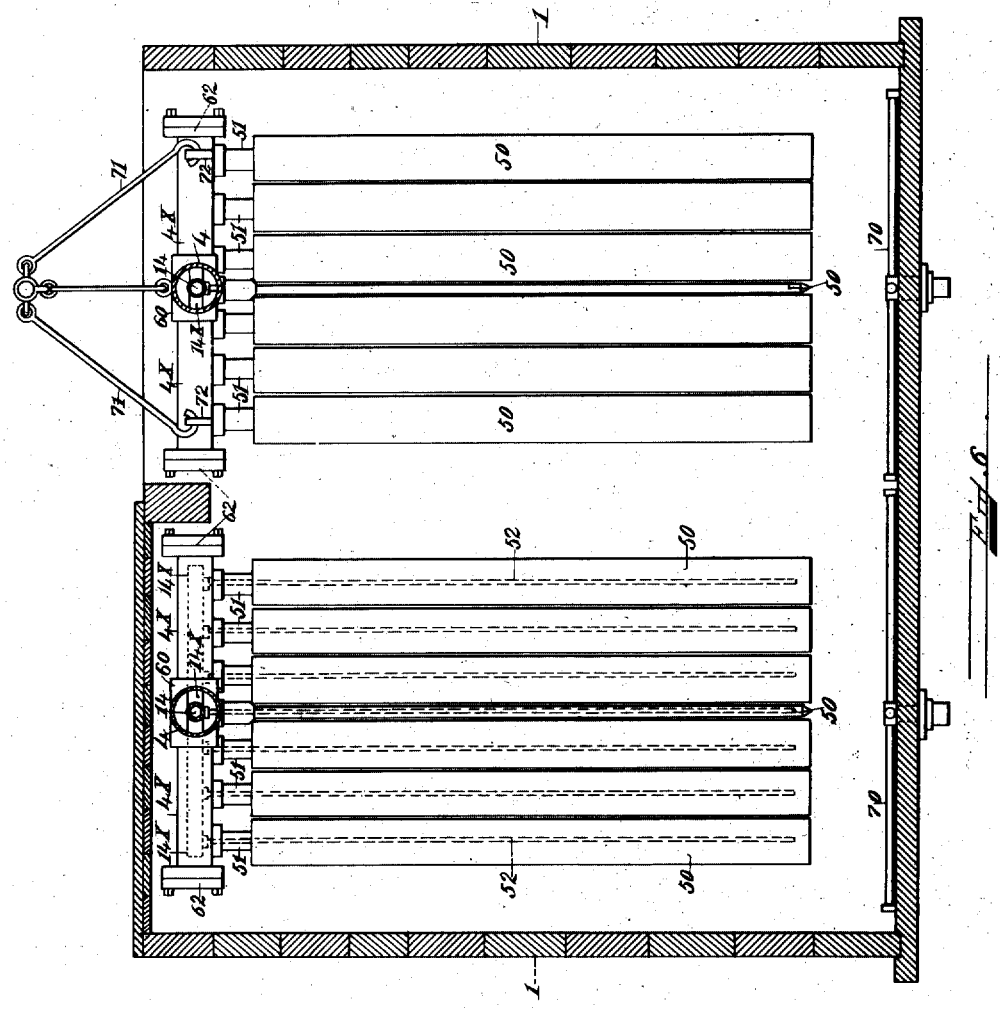
Figure 7:
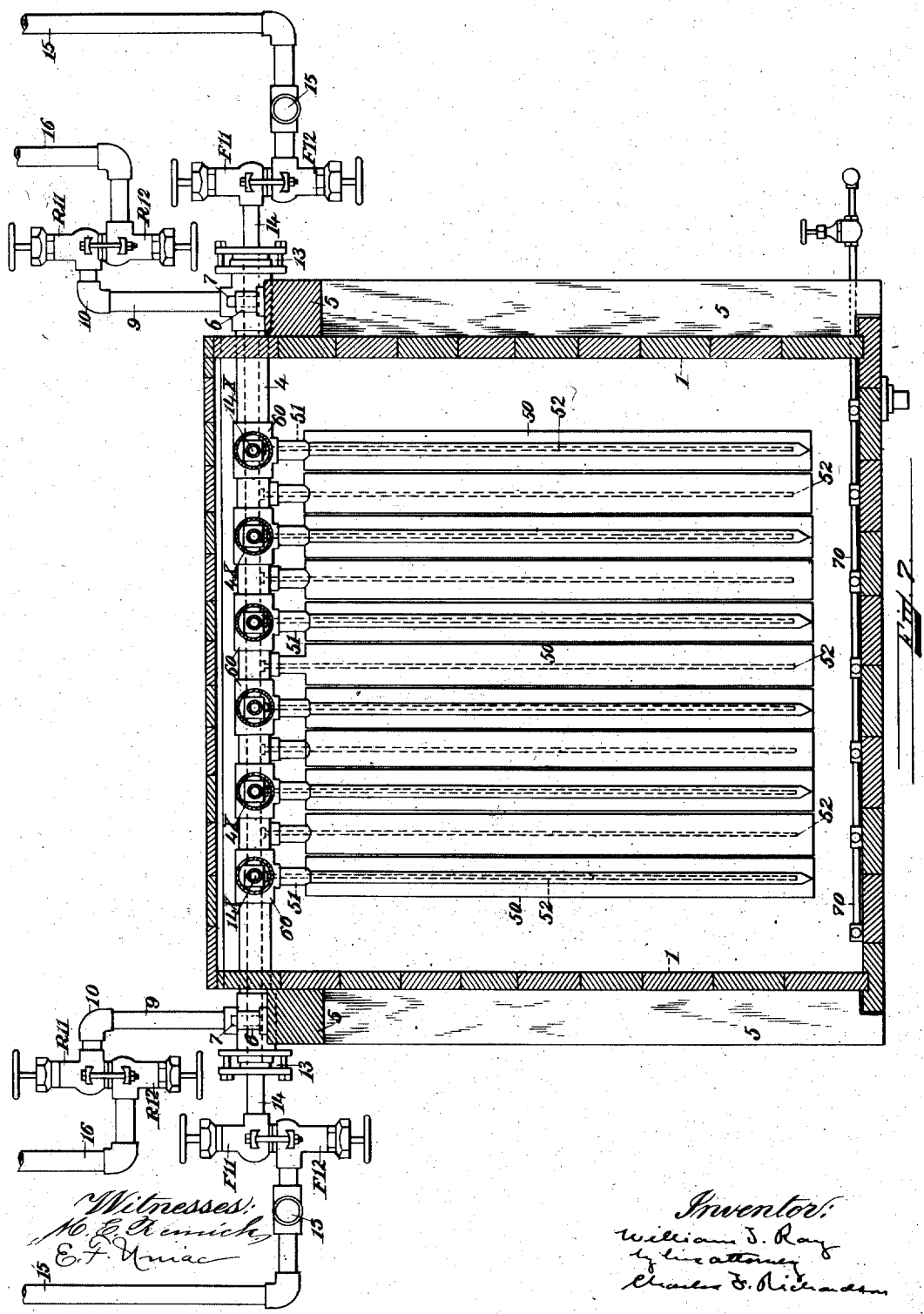
Figure 8:
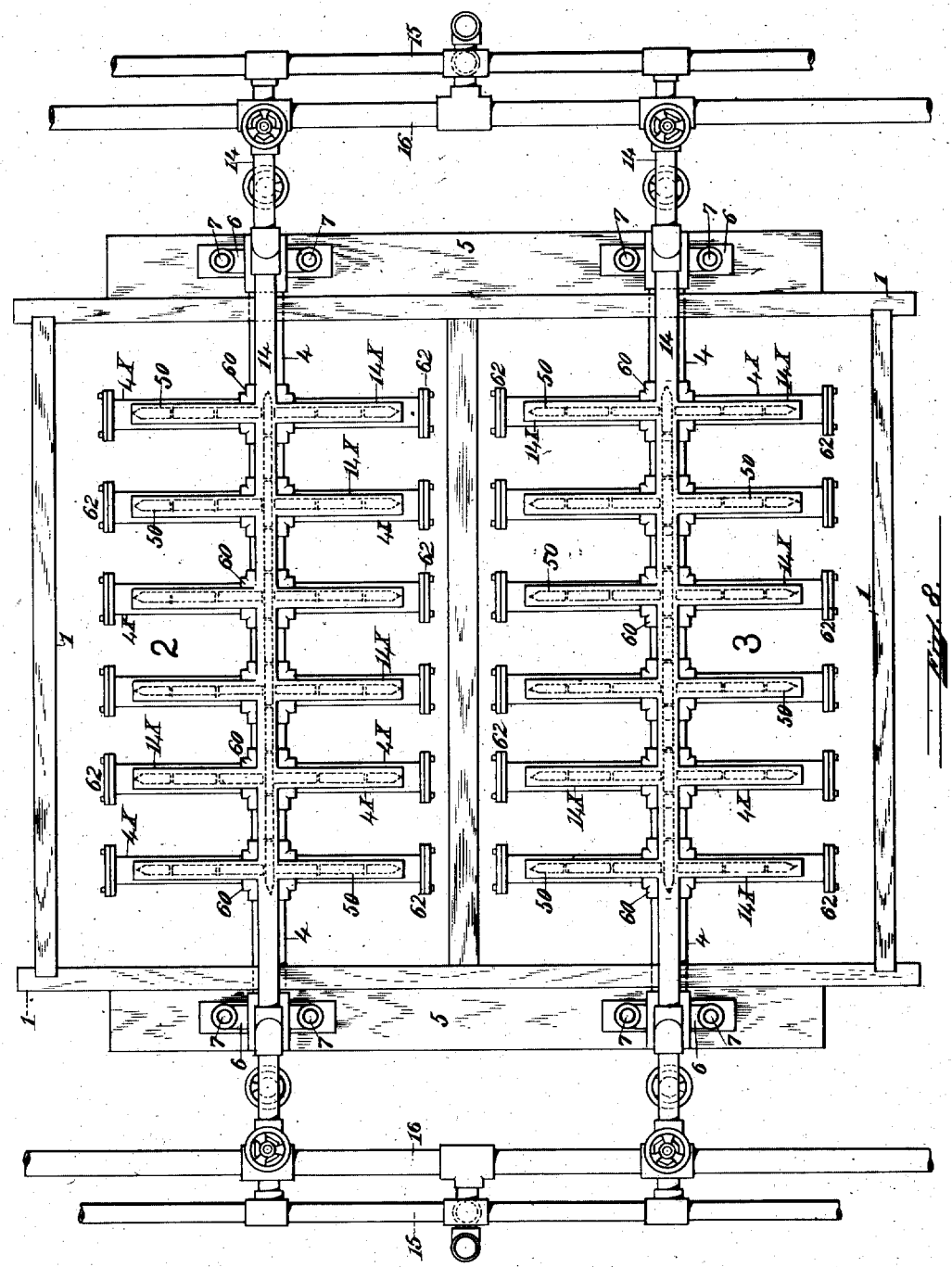
Figure 9:
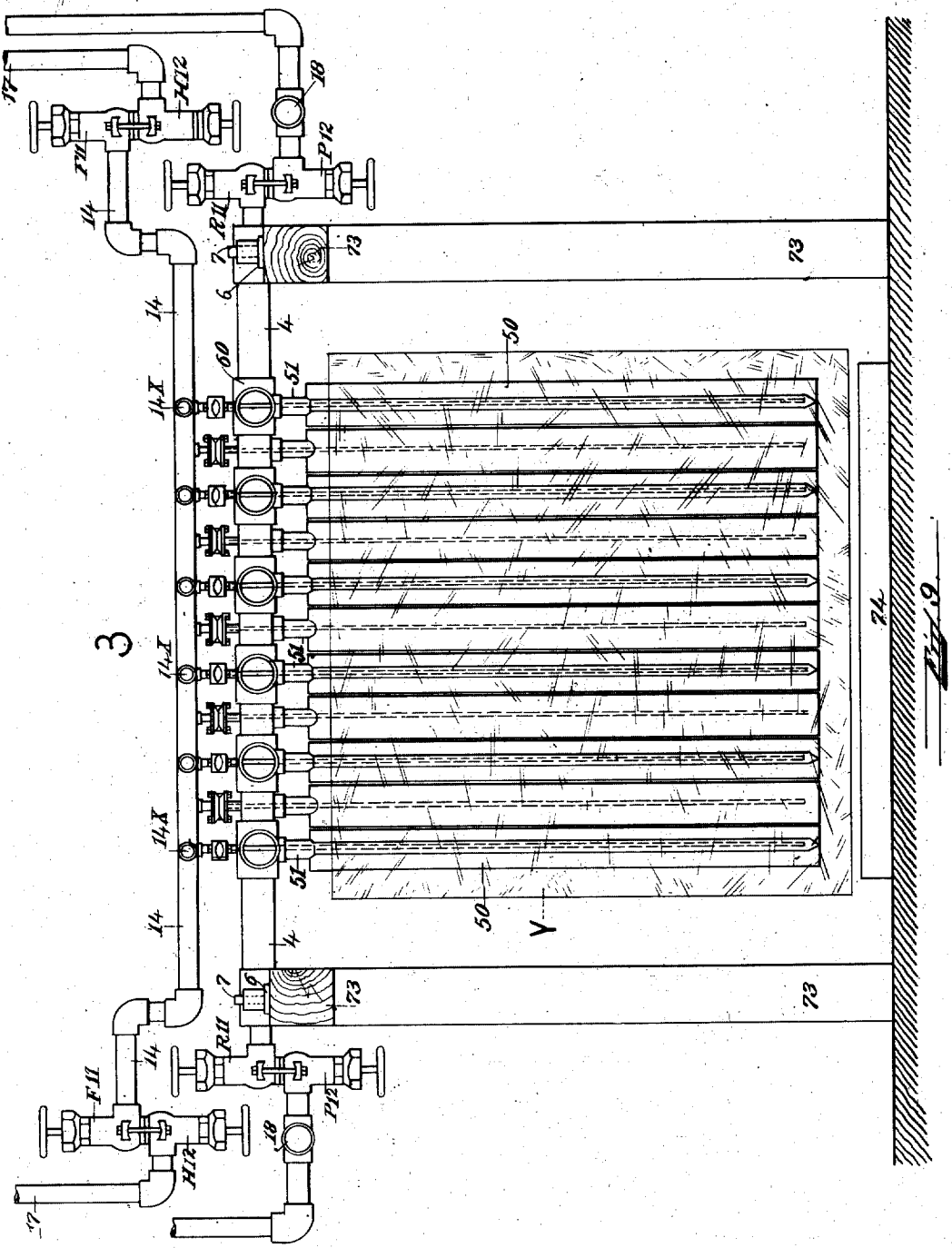
Figure 10:
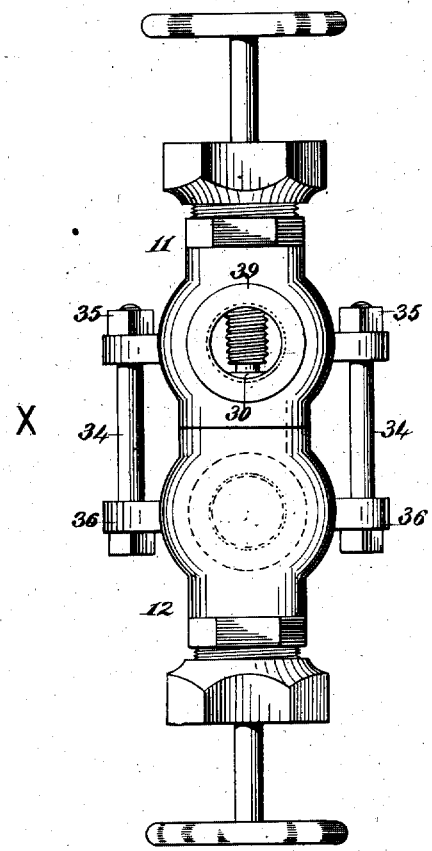
Figure 11:
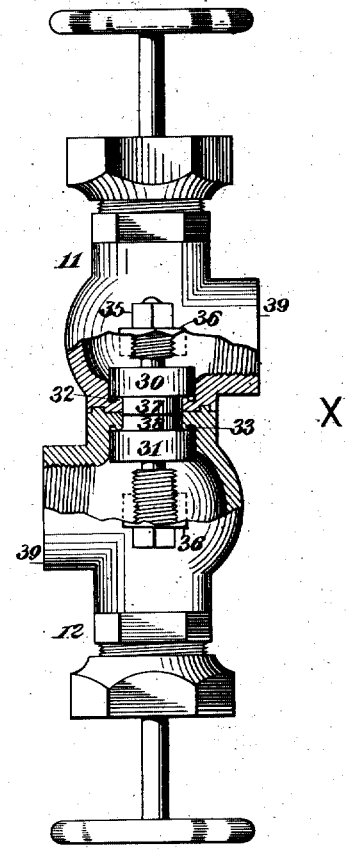

In the drawings illustrating the principles of my invention and the best mode now known to me of embodying them, Figure 1 is a perspective view of a water tank, traveling hoists, two ice forming devices or "clusters" with ice thereon; one ready to be lifted out of the tank; the other, lifted out and supported upon a standard, and in position to have its block of ice disengaged from it. This view also shows in perspective, a series of saws used in cutting up the blocks. Fig. 2 is a perspective view of a grab employed in harvesting the block subsequently to its release from its cluster. Fig. 3 is a perspective view showing a block of ice in one stage of the process of cutting the block up into smaller pieces. Fig. 4 is a perspective view showing the grab with the resulting pieces of ice therein; the grab having been moved into position to permit the several pieces of ice in marketable condition, to slide off the grab, and on to, say, a delivery platform. Fig. 5 is a perspective view of a "cluster" provided with my anhydrous ammonia twin-valve-coupling suspended, as in transition between the tank and the harvesting standard, shown in Fig. 1. Fig. 6 is a transverse section of the freezing tank, showing two removable freezing devices or "clusters," one being in cross section, and in operative position in the tank and covered by closed doors; while the other, in end elevation, with pipes in section, is connected with suitable means for moving it, as into or out of operative position in the tank. Fig. 7 is a longitudinal section of the tank showing one of the freezing clusters mounted in the tank, and the severable connections employed. Fig. 8 is a plan of the clusters and tank shown in Figs. 25 and 26. Fig. 9 is an elevation showing a cluster, in modified form, after it has been removed from the freezing tank, and is mounted on a harvesting standard, and suitably connected to disengage a block of ice from the cluster. Fig. 10 is a front elevation of my anhydrous ammonia twin-valve-coupling. Fig. 11 is a side elevation of the above mentioned valve-coupling with portions of its side broken out to show how, when the valves are in their seats, and the members of the coupling are ready to be separated, all ammonia has been excluded from the space between the valve seats and there is no anhydrous ammonia to escape when the coupling is parted. Fig. 12 is a plan of my hollow unit freezing plate or blade; while Figs. 13 and 14 are respectively a side, and an end elevation of said freezing plate. Fig. 15 is a plan of a unit end freezing plate or blade with a converging edge; while Figs. 16 and 17 are respectively an end, and a side elevation of said blade. Fig. 18 is a longitudinal section of a unit freezing blade, a feed pipe and a return pipe therein, and connections for assembling them in operative relations, as shown in Figs. 6 and 7. Fig. 19 is a modified form of what is shown in Fig. 18, the feed pipe being outside of, and above the return pipe. See also Figs. 9, 25 and 26. Fig. 20 is a plan showing a block of ice, and a grab sustaining the block; with harvesting blocks formed therein, and vacated by, the freezing device or cluster. Fig. 21 is a plan of a series of saws used in cutting up a block of ice, transversely, into a number of smaller blocks; while Fig. 22 shows a saw to cut through the bottom of the blocks, longitudinally to divide the smaller blocks, as shown in Fig. 4. Fig. 23 is an elevation of the grab, and a block of ice therein ready to be divided by the saw shown in Figs. 4, 22 and 23. Fig. 24 is an end elevation of the series of saws shown in Figs. 1, 3 and 21. Fig. 25 is a view like Fig. 6, except that its unit freezing plates or blades and connections are of the construction shown in Fig. 19; while Fig. 26 is a view like Fig. 7, except that its unit freezing plates and connections are of the construction shown in Fig. 18.

A water tank 1, Fig. 1, of any suitable material is provided, and has proper water inlets and outlets. It is shown large enough for two removable ice forming devices 2, 3, to operate simultaneously, but that it may be continuously operated at its full capacity, there must be additional devices to keep filled any space left vacant by one device in the process of harvesting its crop of ice. In Fig. 1, the space vacated by one device 3, is left so, in order not to confuse the drawing; as a fact, it ought to be shown filled by an additional device. As these devices and spaces therefor in the tank are shown in duplicate simply to make plain the arrangement and use of a single tank and a plurality of such devices with common piping; a description of one device, as 3, and its operation will, in so far as my invention be concerned, be sufficient.

The ice forming device 3, Figs. 1, 5, 6, 7 and 8, shown in what I term "cluster" form, is supported by a return pipe 4, extending over the top and lengthwise of the tank, and resting as on suitable supports 5, 5, Figs. 1 and 7, outside of the tank. The depth, width and length of the ice forming cluster, see Figs. 6, 7 and 8, are such that when a block of ice is frozen to the desired size, it is not in contact with any portion of the bottom or of the sides of the tank; does not have to be disengaged therefrom; and no sediment, if any, can be frozen into the resulting block. Each of the two end portions of the return pipe 4 has a head 6 designed to rest upon the supports 5, 5, which, to secure the heads in proper position, have upwardly projectng lock pins 7, 7, to engage corresponding holes 8, 8, in the head, so that by raising or lowering the heads, out of or into engagement with the pins, the heads and the freezing cluster, may be released, or may assume locked position.

Extending upwardly from each head 6, and connected to the return pipe 4, is a pipe 9, with an elbow 10 that has one of the two severable parts 11, 12, of anhydrous ammonia twin-valve-coupling R, Figs. 5 and 7, see also X, Figs. 10 and 11. Extending outwardly from said head in the axis of the return pipe 4, and through a stuffing box 13, is a feed pipe 14 for the freezing cluster, the outer end portion of which has a like severable part 11 of another anhydrous twin-valve-coupling F, like X, shown in Figs. 10 and 11. So much of the above description clearly appears in Fig. 5.

A common feed pipe 15 and a common return pipe 16, Figs. 1, 7 and 8, outside of the tank, extend across the opposite ends of the tank, and each of said pipes has connected therewith the other portion 12 of the above mentioned couplings F, R, so arranged that when the heads 6, 6, on the return pipe are in their supports 5, 5, the corresponding portions 11, 12, of each of said couplings F, R, are in position to be at once coupled together; the feed pipe, and the return pipe connections thus become completed. Should these couplings be severed and the cluster be in the condition shown in Fig. 5, it could be lifted out and away from the tank; and, were there ice on it, it could be lowered on to a harvesting standard, see Figs. 1 and 9, and its severed valve-coupling members $F^{12}$, $R^{12}$, connected with corresponding valve coupling members $H^{11}$, $R^{11}$, used in supplying and controlling the circulation of hot gas from a common hot gas feed pipe 17 through the cluster, and a common return pipe 4.

Having given a general description of the removable cluster and its piping and connections, I will now particularly consider that portion of my invention embodied in the above mentioned anhydrous ammonia twin-valve-coupling reference being had to X, Figs. 10 and 11. It comprises two coupling members 11, 12, within which are provided valves 30, 31, and seats 32, 33. The abutting faces of the coupling members are provided with a male and female joint, and are secured in normal position by bolts 34 and nuts 35 which engage a pair of ears 36 on the outside of each member. When the valves are in their respective seats, the communicating space between the seats is filled, as by portions 37, 38, of the valves which extend toward each other and abut. Each coupling member is provided with a lateral connection 39, whereby it may be connected to one of the two pipes to be continuously united. It is now obvious that by moving the valves 30, 31, off their seats 32, 33, the two members of the coupling are in open communication; that when one valve 30 is turned and finds its seat 32, the portion 37 fills the space between the valve seat and the valve outlet; and that when the second valve 31 is turned and finds its seat 33, the outside face of the portion 38 of the valve 31 abuts the corresponding face of the first valve 30, at the moment the second valve 31 finds its seat 33. In other words, when the valves seal their respective coupling members, all gas or liquid in the two members of the coupling is excluded from the space between the two valve seats; and by removing the nuts 35, and the bolts 34 from the ears 36, the abutting coupling members may be separated without the escape of any liquid or gas, for there is substantially none between the two valve seats to escape.

A reference to Fig. 5 will make plain the fact that the freezing device or cluster with its contained gas or liquid may be removed to another location, and, if desired, connected with other corresponding portions of like twin-valve-couplings, controlling the contents of other pipes, say, hot gas pipes 17, 17, and pump out pipes 18, 18, Figs. 1 and 9, employed in harvesting a block of ice.

Any removable freezing device may be used with valve-couplings embodying the principle above described, but I prefer to use the "cluster" construction, and its various patentable features. My freezing device is based on the principle of building up of a number of freezing units, into a form that will produce ice having the desired shape, size, etc. Each unit comprises not only a hollow metal blade 50, Figs. 12 to 19 inclusive, which is long, narrow and thin, and has a threaded neck 51 to be fixed in the return pipe 4; but also a metal pipe 52 to be connected with a liquid feed pipe 14, and be led down through the inside of the neck and blade, to near the bottom of the blade, so that liquid anhydrous ammonia or hot gas may be delivered at the bottom of the inside of the blade, and from there permitted to circulate up through the blade, and enter the return pipe 4 which incloses the feed pipe, as in Fig. 18, or which lies without, and below, the feed pipe, as shown in Fig. 19. Other like units are suitably arranged, and abut each other so as to form two continuous plane freezing surfaces in the manner shown in Figs. 5, 6, 7 and 8.

The two plane ice forming surfaces 53, 54, of the blades 50, Figs. 14, 16, slightly taper toward the bottom to facilitate the removal of the blades from the ice; and where, as I use them, to form harvesting slots 55, 56, Figs. 1, 3, 9, 20, in the resulting block of ice Y, I cause the side portions 57, and the bottom portions 58, of the blades, forming the ends and the bottoms of the slots, to converge to a single edge, as shown in Figs. 13 to 17 inclusive.

To produce and to harvest a certain amount of clear, marketable ice in the quickest time possible now known to me, I have adopted the arrangement of blades shown in Fig. 5, so that one large block Y can be formed, out of contact with the sides or the bottom of the tank, and provided with harvesting slots 55, 56, Figs. 3 and 20, which almost completely divide the block into smaller blocks $y$, $y$, Fig. 4, of the desired shape and size. A block so formed, together with the cluster, is shown in Figs. 1 and 9.

The main return pipe 4, Figs. 5, 6, 7, 8, is made up of a number of pieces of pipe united in line by means of four way couplings 60 at suitable distances apart. A pair of branch return pipes $4^x$, $4^x$, are mounted at right angles to the main return, in the opposite openings in each coupling, and have their open ends closed by suitable flanged blanks or caps 62. Arranged in the vertical planes passing through the axes of the main return, and the branch return pipes, are the unit blades 50, as shown in Figs. 6 and 7. The main feed pipe 14, and branch feed pipes $14^x$, are axially mounted within the main and branch return pipes, and have extending downward through the blades, blade feed pipes 52 that open into the bottom portions of the blades, in a manner already described. As shown in Figs. 1, 5 and 7, and already explained, the end portions of the main return pipe are mounted by stuffing boxes 13, 13, in heads 6, 6, removably sustained by supports 5, 5, on the outside of the tank. For each end of each feed pipe, and of each return pipe, there is one member 11 of its respective twin-valve-coupling; there being one corresponding member 12 connected to each of two common return headers 16, 16, extending across the outside of the tank, and in turn connected, say, to an accumulator, not shown, but communicating, for example, with the suction side of a compressor, also not shown; and another member 12 connected with each of two common feed headers 15, 15, leading to a liquid receiver, not shown. While it is not necessary to feed and to withdraw the ammonia or hot gas at both ends of the feed pipe, and of the return pipe, yet by so doing, I greatly hasten the circulation of the refrigerant and the gas, and hence the formation of ice on, and the release of ice from, the freezing blade surfaces. On the bottom of the tank there are agitation pipes 70, Figs. 6 and 7, from which air may be released to cause the desired circulation of the water in the tank.

The tank being sufficiently full for the water to be a little below the level of the tops of the blades; and the cluster being in the connected position shown, say, in Figs. 6, 7, and 8; refrigeration may be begun, by opening one or both of the twin valves F, F, in the feed pipe 14, thereby flooding all of the blades 50, 50, and the main and branch return pipes 4, 4$^x$; and by controlling the flow through the said valves and the return twin-valves R, R, of the anhydrous ammonia, which boils up through the blades and rapidly absorbs the heat from the water contacting the sides of the blades. Ice in a continuous piece will at once begin forming on all the immersed surfaces of the blades of the cluster, and gradually build out from all of the surfaces constituting the ice forming spaces, until a substantially rectangular block, as shown in Figs. 1, 3, 9 and 20, is formed. But it is to be noticed that this block will be complete before it reaches the sides of the tank, and before it has built down far enough to contact the bottom of the tank. The ice block is now ready to be harvested. To remove the block from the tank, first, all of the twin-valves F and R must be closed; the ammonia in the cluster becoming locked therein; and the ammonia in the feed and the return pipes, being prevented from escaping therefrom. Next, each coupling is broken by removing the nuts 35, and bolts 34 from the ears 36 on the coupling members 11, 12; and, by means of a traveling hoist H, Figs. 1 and 5, chains, bars, links and hooks 71 that catch into rings 72 fixed in the main return and branch pipes 4, 4$^x$, see Figs. 1, 5 and 6; the cluster is raised up from its support 5, 5, and tank 1, and out and away to a harvesting standard 73, where it is sustained, and each of its severed valve-coupling-members F$^{11}$, R$^{11}$, is connected to another corresponding coupling member H$^{12}$, P$^{12}$, respectively, on a common hot gas feed pipe 17, and a common pump out pipe 18, in a way already described. The ice, as shown in Figs. 1 and 9, is now allowed to temper a sufficient length of time; then the twin-valves P, R connecting with the pump out pipes 18 are opened to withdraw the ammonia in the cluster, and at the same time, the valves F H communicating with the hot gas header 17, are opened to allow hot gas from the compressor to enter the hot gas header through the twin-valves opening into the main feed pipe. A short distance below the bottom of the block of ice, is a wooden base or table 74, of less dimensions than those of the bottom of the block, so that when the ice has melted enough to become freed from the freezing surfaces of the blade, it settles down on the table; and the freed cluster, in turn, may be made ready to occupy the space in the tank, next to be made vacant by the removal of a duplicate cluster.

To facilitate the harvesting of the block of ice, after it has been left on the harvesting table, I employ a "grab" which constitutes a feature of my invention, and is shown in Figs. 2, 3 and 4. This feature is not claimed herein, but is described and claimed in divisional application for Letters Patent for grab apparatus, Serial No. 564,924, filed by me June 4, 1910. As the block Y has harvesting slots 55, 56, that almost divide and sever it longitudinally and transversely into, say fourteen pieces, there are seven pairs of legs 80 and feet 81, one leg and foot for each piece of ice. The legs of each pair are, at their top portions, pivoted respectively to a pair of parallel pivot rods, 82, 83, which, in turn, by links 84, are pivoted to a third parallel or hook rod 85, serving to be caught and sustained as by the hooks 71 of the traveling hoist H. The parallel pivot rods may be held at the desired distance apart, $i.\ e.$ a little more than are the opposite sides of the block, by lock rods 86, while operating rods 87 are removably mounted in hook supports 88 on the backs of the legs. The tops of the feet have sharp spiked surfaces, while each leg of each end pair has a shield 89 to prevent end pieces of ice from falling out of what might be termed the "cage" formed by these legs and feet. The block Y being on the harvesting table 74, the "cage" Fig. 2, by means of the traveling hoist H, may be lowered down over the block, the feet being swung out by the operating rods 87 to permit the feet to pass down the outside of the block. When they reach the bottom, they are slid in under the block, Fig. 20, the sides of the table being far enough in from the bottom edges of the block, so as not to interfere with this inward movement of the feet. When the latter are in proper adjustment, the hoist raises the cage; the feet and spikes engage the bottom of the block; and the latter is lifted and may be carried away for further steps in the process of harvesting, viz. completely severing the block into the number of smaller blocks contemplated.

A series of circular ice saws 90, Figs. 1 and 3, is mounted on a shaft 91, in suitable bearings, and driven by suitable power. The distance between each adjacent saw equals the distance between the transverse harvesting slots 56 in the ice, and the radius of each saw is enough to permit each saw to cut through the ice separating the ends, and bottoms, of the harvesting slots from the outside of the block. A reference to 13

Fig. 3 will show how the same operate. The cage is moved toward and partially under the saws, until the saws and the transverse harvesting slots are in the same vertical planes. The cage with the block is then gradually raised; the saws severing the ice as indicated. When the sides are cut, the block is next moved horizontally against the same, so that that portion of the bottom of the block, separating the bottom from the bottom of the cross harvesting slots, is cut in the plane of the harvesting slots. When the bottom has been cut across, the cage is lowered, on the other side of the saw shaft, and the remaining ice between the outside of the block and the ends of the transverse harvesting slots, is severed. The block has now been cut up into seven pieces, that remain to be cut longitudinally. This may be done by a circular saw 92, see Figs. 4 and 23, that may be moved along under the cage and contained blocks; the saw being controlled by rails 92$^x$ upon which it may be mounted, and, operated by, say, an electrical motor operatively connected with the saw, but not shown. This saw moves along a passage 93 therefor in a dividing table 94, having sides 95 inclined downward and away from the saw passage 93. In the floor 96 upon which they are fixed, there are slots 97 cut at right angles to the saw passage, and their distances apart equal the distances between ribs 98 cast on the outside of the legs and feet of the grab cage. To cut these seven blocks longitudinally, the cage is moved so that the plane of the longitudinal harvesting slot 55, Fig. 23, of the seven blocks is in the plane of the rotating circular saw. By causing the circular saw 92 to move against and under the blocks, they become completely divided longitudinally, and there are left in the cage, fourteen pieces $y$, $y$, of clear ice, of the desired form and size. To release the fourteen blocks from the cage, the latter is lowered so that the bottom of the feet 81, Fig. 4, engage the inclined sides 95 of the dividing table 94; the operating rods 87 are removed from their hook supports 88; the lock bars are lifted; and the hooks 71 from the hoist H are allowed to continue to descend. As the center of gravity of each piece of ice and its leg and foot, is at one side of the point of engagement between the foot and the inclined side of the dividing table, the legs with their blocks of ice, and the parallel pivot rods to which the legs are pivoted, move apart and about said points of engagement, and finally contact the delivery floor 96, as shown in Fig. 4. But when they do so, or whenever the legs are sufficiently inclined, the fourteen blocks of clear ice slide out and off of the legs, and onto a delivery floor, ready for shipment or storage. The cage is returned to operative position by raising the hook rod 85, and, when the pivot rods 82, 83, are in proper relation, by locking them therein by the lock rods 86. The cycle of operations required in making and harvesting a block of ice has now been completed; but there are, as shown in Fig. 1, and already described, one or more similar cycles in various stages of progress; and suitable appliances are ready at hand to complete the unfinished cycles, and to begin new ones.

Having described the construction and operation of my invention, and desiring to protect it in the broadest manner legally possible, what I claim is:—

1. An ice forming device comprising a hollow metal blade having a neck adapted to be connected with a refrigerating return pipe; and a feed pipe to feed refrigerant to the blade at or near the bottom of the inside of the blade.

2. An ice forming device comprising a number of duplicate hollow metal blades which abut and lie in the same plane; a common return pipe, and a common feed pipe; a neck for each blade, connected to the common return pipe; and a pipe for each blade, connected to the common feed pipe, and passing down through said neck and into said blade, to feed a refrigerant to the blade at or near the bottom of the inside of the blade.

3. An ice forming device comprising a common feed pipe; a common return pipe; inlet and outlet connections in said pipes; branch feed pipes and branch return pipes extending outwardly from, and at right angles to, their respective common feed pipe and common return pipe; a number of hollow metal blades which abut and lie in the same plane with the common feed pipe and return pipe; and a number of like hollow blades which abut and lie in the same plane with their respective branch feed pipes and branch return pipes; each blade being provided with a neck to connect to its return pipe; a pipe for each blade, connected to its feed pipe and passing down through said neck and into said blade to feed a refrigerant to the blade at or near the bottom of the inside of the blade.

4. An ice forming device adapted to be removably mounted in a water tank, and comprising a common feed pipe; a common return pipe; inlet and outlet connections in said pipes; branch feed pipes and branch return pipes extending outwardly from, and at right angles to, their respective common feed pipe and common return pipe; a number of hollow metal blades which abut and lie in the same plane with the common feed pipe and common return pipe; a number of like hollow metal blades which abut and lie in the same plane with their respective branch feed pipe and branch return pipe;

each blade being provided with a neck to connect to its return pipe; a pipe for each blade, connected to its feed pipe and passing down through said neck and into said blade to feed a refrigerant to the blade at or near the bottom of the inside of the blade; and means for preventing the refrigerant gas or liquid from escaping from said common feed pipe and from said common return pipe, when inlet and outlet connections in said common feed pipe and said common return pipe are broken for the purpose of allowing the device to be removed from the tank.

In testimony whereof I affix my signature in presence of two witnesses.

WILLIAM T. RAY.

Witnesses:
E. F. UNIAC,
F. J. V. DAKIN.